United States Patent
Baty et al.

(10) Patent No.: US 10,893,042 B2
(45) Date of Patent: *Jan. 12, 2021

(54) WI-FI ENABLED CREDENTIAL ENROLLMENT READER AND CREDENTIAL MANAGEMENT SYSTEM FOR ACCESS CONTROL

(71) Applicant: Schlage Lock Company LLC, Carmel, IN (US)

(72) Inventors: David M. Baty, Indianapolis, IN (US); Srikanth Venkateswaran, Carmel, IN (US); Paul D. Heal, Arvada, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,468

(22) Filed: Apr. 9, 2019

(65) Prior Publication Data

US 2019/0334890 A1    Oct. 31, 2019

Related U.S. Application Data

(63) Continuation of application No. 15/275,270, filed on Sep. 23, 2016, now Pat. No. 10,257,190.

(51) Int. Cl.
| | |
|---|---|
| *H04L 29/06* | (2006.01) |
| *H04W 12/04* | (2009.01) |
| *H04W 12/06* | (2009.01) |
| *H04W 12/08* | (2009.01) |
| *G06K 7/10* | (2006.01) |

(Continued)

(52) U.S. Cl.
CPC ...... *H04L 63/0853* (2013.01); *G06K 7/10009* (2013.01); *H04W 12/0023* (2019.01); *H04W 12/04* (2013.01); *H04W 12/06* (2013.01); *H04W 12/08* (2013.01); *H04W 12/02* (2013.01)

(58) Field of Classification Search
CPC ........ H04L 9/32; H04L 63/0853; G07C 9/00; H04B 5/00; H04M 1/66; G06F 15/16; H04W 12/0023; H04W 12/04; H04W 12/06; H04W 12/08; G06K 7/10009; G06K 5/00

See application file for complete search history.

(56) References Cited

U.S. PATENT DOCUMENTS

| | | | |
|---|---|---|---|
| 7,536,722 B1 * | 5/2009 | Saltz | H04L 63/0815 726/20 |
| 7,770,787 B2 * | 8/2010 | Anderson | G07C 11/00 235/380 |
| 8,635,462 B2 | 1/2014 | Ullmann | |

(Continued)

FOREIGN PATENT DOCUMENTS

| | | |
|---|---|---|
| WO | 2012116400 A1 | 9/2012 |
| WO | 2014044832 A1 | 3/2014 |

*Primary Examiner* — Thanhnga B Truong
(74) *Attorney, Agent, or Firm* — Taft Stettinius & Hollister LLP (57) ABSTRACT

A method according to one embodiment includes reading a unique credential identifier of a passive credential device, transmitting the unique credential identifier to a credential management system over a secure wireless connection, receiving credential device data from the credential management system over the secure wireless connection, and transmitting the received credential device data to the passive credential device.

20 Claims, 5 Drawing Sheets

(51) Int. Cl.
  *H04W 12/00*      (2009.01)
  *H04W 12/02*      (2009.01)

(56) References Cited

U.S. PATENT DOCUMENTS

| | | | |
|---|---|---|---|
| 8,700,729 B2* | 4/2014 | Dua | G06Q 20/20 |
| | | | 709/217 |
| 9,182,748 B2 | 11/2015 | Herscovitch et al. | |
| 9,196,104 B2 | 11/2015 | Dumas et al. | |
| 2003/0007646 A1 | 1/2003 | Hurst et al. | |
| 2010/0077474 A1 | 3/2010 | Yacoub et al. | |
| 2010/0096451 A1 | 4/2010 | Bossoney et al. | |
| 2010/0096452 A1* | 4/2010 | Habraken | G06Q 20/327 |
| | | | 235/382 |
| 2010/0306549 A1 | 12/2010 | Ullmann | |
| 2012/0079273 A1 | 3/2012 | Bacchiaz et al. | |
| 2012/0315848 A1* | 12/2012 | Smith | H04B 5/0031 |
| | | | 455/41.1 |
| 2013/0024222 A1 | 1/2013 | Dunn | |
| 2013/0214899 A1 | 8/2013 | Herscovitch et al. | |
| 2013/0237193 A1 | 9/2013 | Dumas et al. | |
| 2014/0049360 A1* | 2/2014 | Hulusi | H04L 51/18 |
| | | | 340/5.6 |
| 2014/0292481 A1 | 10/2014 | Dumas et al. | |
| 2015/0143486 A1* | 5/2015 | Hartmann | H04W 12/0608 |
| | | | 726/6 |
| 2015/0235497 A1 | 8/2015 | Voss | |
| 2016/0086400 A1 | 3/2016 | Dumas et al. | |

* cited by examiner

WI-FI ENABLED CREDENTIAL ENROLLMENT READER AND CREDENTIAL MANAGEMENT SYSTEM FOR ACCESS CONTROL

CROSS REFERENCE TO RELATED APPLICATIONS

This application is a continuation of U.S. patent application Ser. No. 15/275,270 filed Sep. 23, 2016, the contents of which are incorporated by reference in their entirety.

BACKGROUND

Credential enrollment readers are used in access control environments to limit access, for example, to a physical entry point (e.g., a door) or an electronic resource. In particular, credential enrollment readers may enroll one or more credential types such as, for example, smartcards and proximity cards. In many circumstances, the credential enrollment reader in an access control system is physically tethered to a computing device via a wired connection (e.g., via a USB connection). Accordingly, the credential enrollment reader may be less interoperable due to wired communication protocols typically being operating system and/or hardware dependent. Such interoperability issues may even arise between different versions of the same operating system. Additionally, the physical tethering may impose a physical portability limitation on the enrollment reader.

SUMMARY

According to one aspect, a method according to one embodiment may include reading a unique credential identifier of a passive credential device, transmitting the unique credential identifier to a credential management system over a secure wireless connection, receiving credential device data from the credential management system over the secure wireless connection, and transmitting the received credential device data to the passive credential device.

According to another aspect, a reader device including a processor and a memory comprising a plurality of instructions stored thereon that, in response to execution by the processor, may cause the reader device to read a unique credential identifier of a passive credential device, transmit the unique credential identifier to a credential management system over a secure wireless connection, receive credential device data from the credential management system over the secure wireless connection, and transmit the received credential device data to the passive credential device.

According to yet another aspect, an access control system may include a credential management system, a credential device, and a reader device configured to read a unique credential identifier of the credential device, transmit the unique credential identifier to the credential management system over a secure wireless connection, receive credential device data from the credential management system over the secure wireless connection, and transmit the received credential device data to the credential device. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
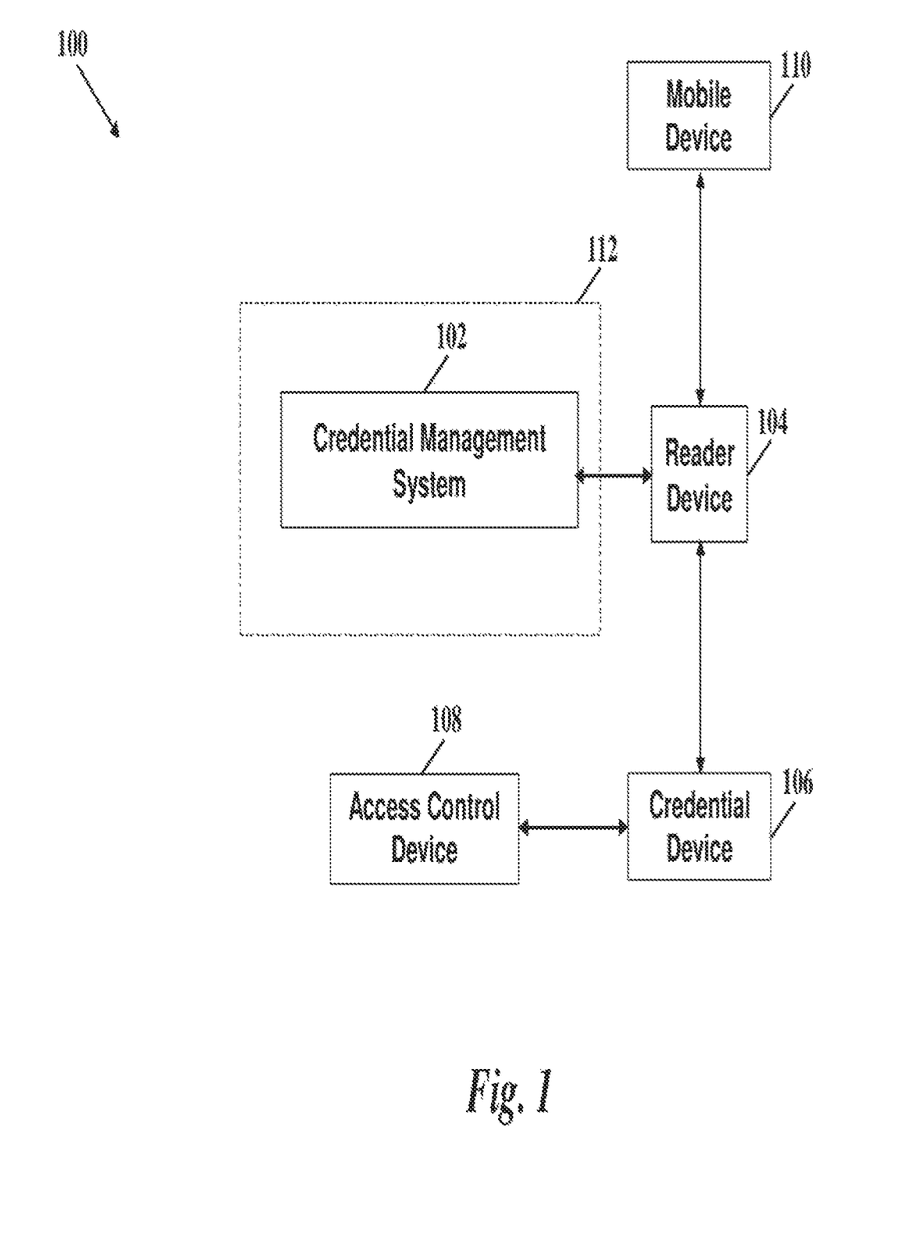
FIG. 1 is a simplified block diagram of at least one embodiment of an access control system for credential enrollment and access control.

Referring now to FIG. 1, in the illustrative embodiment, an access control system 100 for credential enrollment and access control includes a credential management system 102, a reader device 104, a credential device 106, and an access control device 108. Additionally, in some embodiments, the access control system 100 may also include a mobile device 110. As described in detail below, the reader device 104 may be embodied as a credential enrollment reader configured to autonomously communicate with the credential management system 102 (e.g., a cloud-based host system) over Wi-Fi (802.11). Accordingly, in the illustrative embodiment, the reader device 104 may communicate with the credential management system 102 without being physically connected or tethered (e.g., via USB connection or other wired link) to another computing device that is in turn connected to the credential management system 102. As such, the access control system 100 eliminates the need for driver-level software on a computing device to communicate with the reader device 104 over a wired link for credential enrollment, thereby making the reader device 104 physically portable, operating system independent, and secure. In the illustrative embodiment, the access control system 100 solves or improves issues associated with the interoperability of the reader device 104 (e.g., hardware, operating systems, etc.), the physical portability of the reader device 104, the common lack of data security associated with wired communication protocols, and the ability of the reader device 104 to communicate with an arbitrary credential management host/system.

As described below, the reader device 104 may be embodied as a credential enrollment reader having a Wi-Fi communication module/circuit and may be configured to receive credential information (e.g., a unique credential identifier) from a passive credential (e.g., the credential device 106), transmit the credential information to a remote server (e.g., the credential management system 102) by way of the Wi-Fi module, receive data from the remote server, and provide the received data to the credential. For example, in some embodiments, the data received from the server includes a set of instructions to be transmitted from the credential to the access control device 108 for execution by the access control device 108 (e.g., to unlock the device 108). In other words, the reader device 104 may engage in bidirectional communication with a credential management system 102 without a PC as an intermediary. The communication between the reader device 104 and the credential management system 102 may be performed over a secure wireless communication channel such as a Transport Layer Security (TLS) channel and, in some embodiments, additional layers of security may be added to protect the data.

It should be appreciated that each of the credential management system 102, the reader device 104, the access control device 106, and/or the mobile device 110 may be embodied as a computing device similar to the computing device 200 described below in reference to FIG. 2. For example, in the illustrative embodiment, each of the credential management system 102, the reader device 104, the access control device 106, and the mobile device 110 includes a processing device 202 and a memory 204 having stored thereon operating logic 208 for execution by the processing device 202 for operation of the corresponding device/system.

The credential management system 102 is configured to manage the credential(s) corresponding with particular users and/or the access rights of those users to various access control devices 108. For example, in some embodiments, a user, administrator, or technician may create an account with an application (e.g., a smartphone application) capable of interacting with the credential management system 102 for the commissioning/configuration of a particular reader device and/or management of access rights associated with a particular user or access control device. As shown in FIG. 1, in some embodiments, the credential management system 102 forms a portion of a cloud computing environment 112. In other words, the credential management system 102 may be embodied as a cloud-based system in such embodiments. Accordingly, the credential management system 102 may include multiple computing devices and, in some embodiments, the functions performed by the credential management system 102 may be distributed among those computing devices.

In the illustrative embodiment, the credential device 106 is embodied as a passive credential device. In other words, the illustrative credential device 106 does not include its own power source; rather, power is supplied to the credential device 106 by the relevant credential reader (e.g., the reader device 104 and/or the access control device 108). In particular, the credential device 106 may be powered by virtue of communication signals received from other devices (e.g., via RF induction technology). In some embodiments, the credential device 106 may be embodied as a smartcard or proximity card in any suitable form (e.g., card, fob, tag, etc.) adapted to perform the functions described herein.

The reader device 104 may be embodied as any device capable of reading the credential device 106 and otherwise performing the functions described herein. For example, in some embodiments, the reader device 104 is capable of contactless communication with the credential device 106 and secure wireless communication with the credential management system 102. In particular, the reader device 104 may communicate with the credential management system 102 over Wi-Fi through a wireless access point (e.g., router) without communicating through another intermediary device such as a PC. In an alternative embodiment, the reader device 104 may utilize a gateway (e.g., a tablet computer, mobile phone, dedicated gateway, or other suitable device) as a communication route to the credential management system 102 instead of communicating directly to the Wi-Fi network. For example, in such alternative embodiments, the reader device 104 may communicate with the gateway via BLE or another wireless communication mechanism different than Wi-Fi. The reader device 104 may be internally powered (e.g., by virtue of an alkaline or lithium ion battery) or externally powered (e.g., by virtue of an AC mains power source or a USB connection with a suitable device) depending on the particular embodiment.

The access control device 108 may be embodied as any device capable of securing access to a physical area or electronic resource. For example, in the illustrative embodiment, the access control device 108 is embodied as an electronic lock configured to control one or more latches of a door (e.g., lock/unlock), thereby controlling passage through the door.

As indicated above, in some embodiments, the access control system 100 includes a mobile device 110. In such embodiments, the mobile device 110 may execute a mobile application to commission the reader device 104 and/or configure the Wi-Fi settings of the reader device 104 (e.g., based on user input). In other embodiments, it should be appreciated that another computing device may be used to perform such operations (e.g., the reader device 104 itself).

Figure 2:
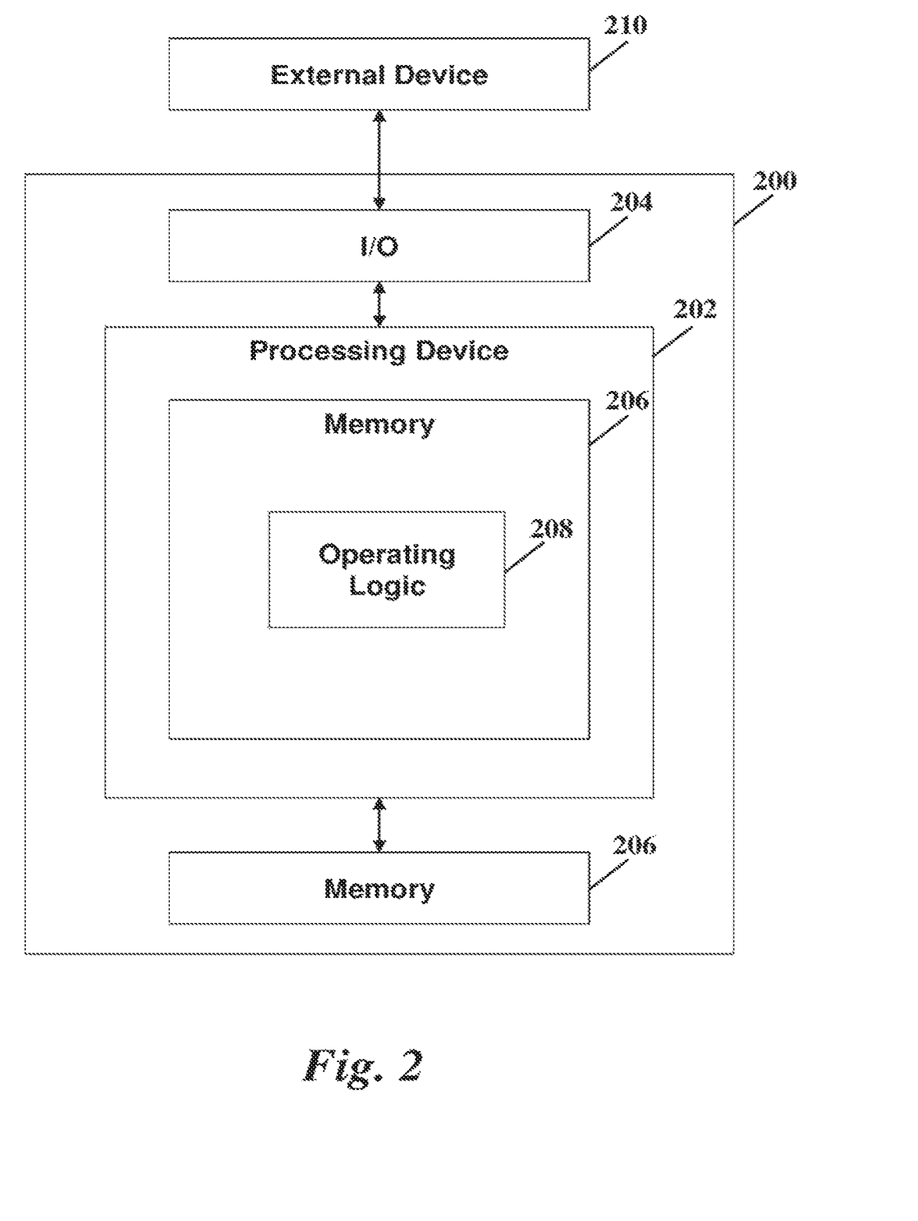
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of a credential management system, reader device, access control device, controller, and/or server that may be utilized in connection with the credential management system 102, the reader device, and/or the access control device 108 illustrated in FIG. 1. Additionally, it should be appreciated that one or more components of the computing device 200 may be included in the credential device 106 depending on the particular embodiment (e.g., the processing device 202 and the memory 206). The computing device 200 includes a processing device 202 that executes algorithms and/or processes data in accordance with operating logic 208, an input/output device 204 that enables communication between the computing device 200 and one or more external devices 210, and memory 206 which stores data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as a credential management system (e.g., the credential management system 102), reader device (e.g., the reader device 104), credential device (e.g., the credential device 106), access control device (e.g., the access control device 108), server (e.g., in a cloud computing environment and/or the credential management system 102), desktop computer, laptop computer, tablet computer, notebook, netbook, Ultrabook™, mobile computing device, cellular phone, smartphone, wearable computing device, personal digital assistant, Internet of Things (IoT) device, processing system, router, switch, diagnostic tool, controller, printer, display, alarm, illuminated indicator (e.g., a status indicator), peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing device 202, I/O devices 204, and/or memories 206 in other embodiments. Further, in some embodiments, more than one external device 210 may be in communication with the computing device 200.

Figure 3:
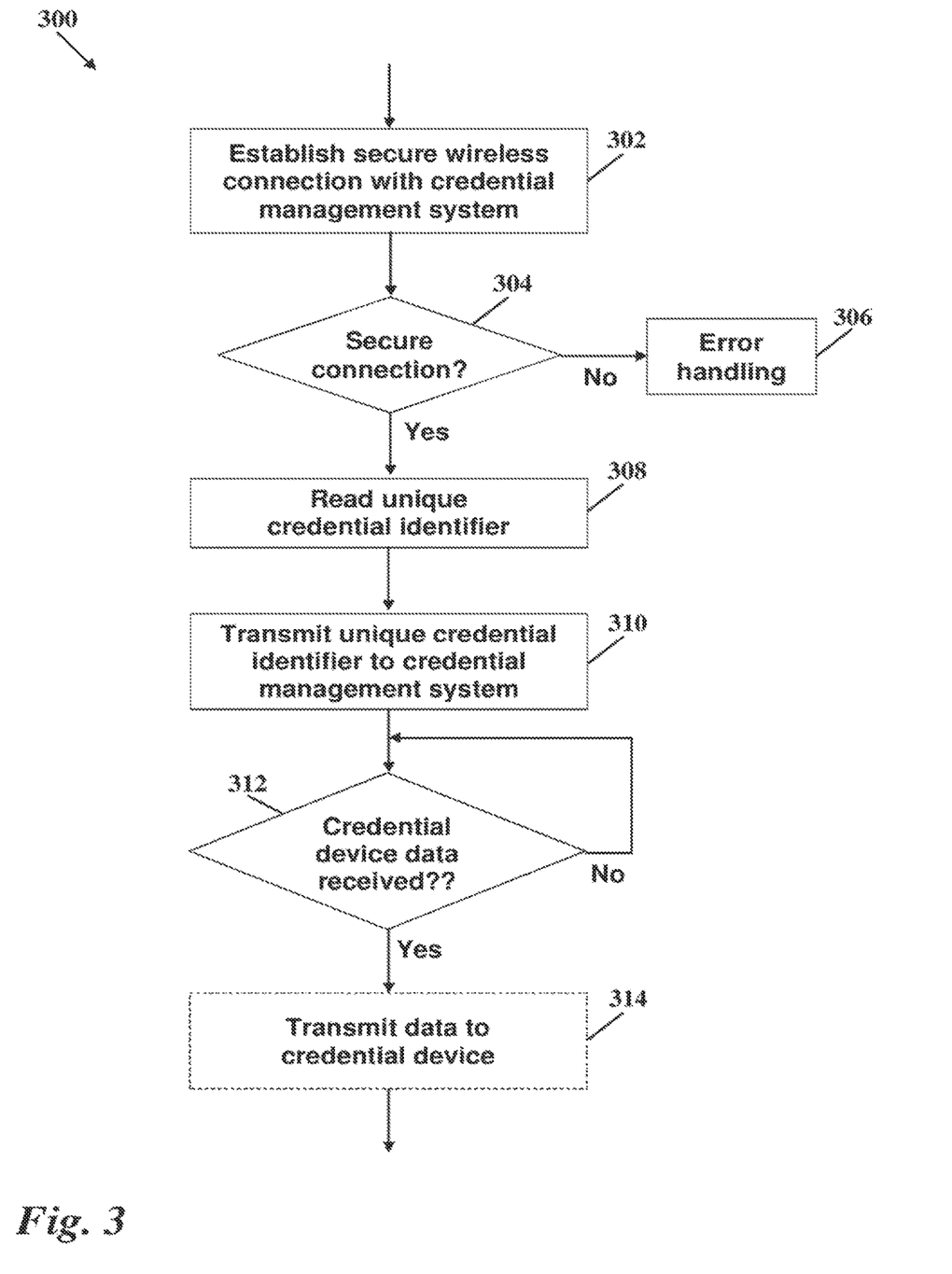
FIG. 3 is a simplified flow diagram of at least one embodiment of a method for credential enrollment and access control.

Referring now to FIG. 3, in use, the access control system 100 or, more particularly, the reader device 104 may execute a method 300 for credential enrollment and access control. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 in which the reader device 104 establishes a secure wireless connection with the credential management system 102 (e.g., a secure Wi-Fi connection). For example, in some embodiments, the reader device 104 may establish a secure wireless connection between the reader device 104 and the credential management system 102 as described below in reference to FIG. 4.

In block 304, the reader device 104 determines whether the secure wireless connection has been established. If not, the reader device 104 may perform one or more error handling procedures. For example, in some embodiments, the reader device 104 may reattempt to establish the secure connection. It should be appreciated that the devices of the access control system 100 may perform various other error handling procedures as appropriate. For example, the access control system 100 may handle access point failures, host failures, and/or other errors/failures with a suitable error handling procedure. Additionally, visual feedback may be provided to the user when and where applicable.

Once the secure connection is established, predefined APIs may be used to pass credential information and receive responses. Accordingly, if the reader device 104 determines in block 304 that the secure wireless connection (e.g., Wi-Fi connection) has been established between the reader device 104 and the credential management system 102, the method 300 advances to block 308 in which the reader device 104 reads a unique identifier of the credential device 106 (i.e., a unique credential identifier). It should be appreciated that the unique credential identifier may be in any format suitable for performing the functions described herein.

In block 310, the reader device 104 transmits the unique credential identifier to the credential management system 102 over the secure wireless connection (e.g., a secure Wi-Fi connection). In block 312, the reader device 104 determines whether any data has been received from the credential management system 102 for transmittal to the credential device 106. If so, the reader device 104 may transmit the received data to the credential device 106 in block 314. As indicated above, the data received from the credential management system 102 and transmitted to the credential device 106 may include a set of instructions for transmittal to the access control device 108.

Returning to block 312, if the reader device 104 has not received data to be transmitted to the credential device 106, the method 300 may return to block 312 in which the reader device 104 waits to receive such data (e.g., until a predetermined threshold period of time has passed). In other words, the reader device 104 transmits any data received from the credential management system 102 and intended for the credential device 106 to the credential device 106. In some embodiments, it should be appreciated that multiple messages may be received from the credential management system 102 including data for transmittal to the credential device 106. In some embodiments, the credential device 106 may store the received data in memory of the credential device 106 for subsequent processing and/or transmittal (e.g., to an appropriate access control device 108).

Figure 4:
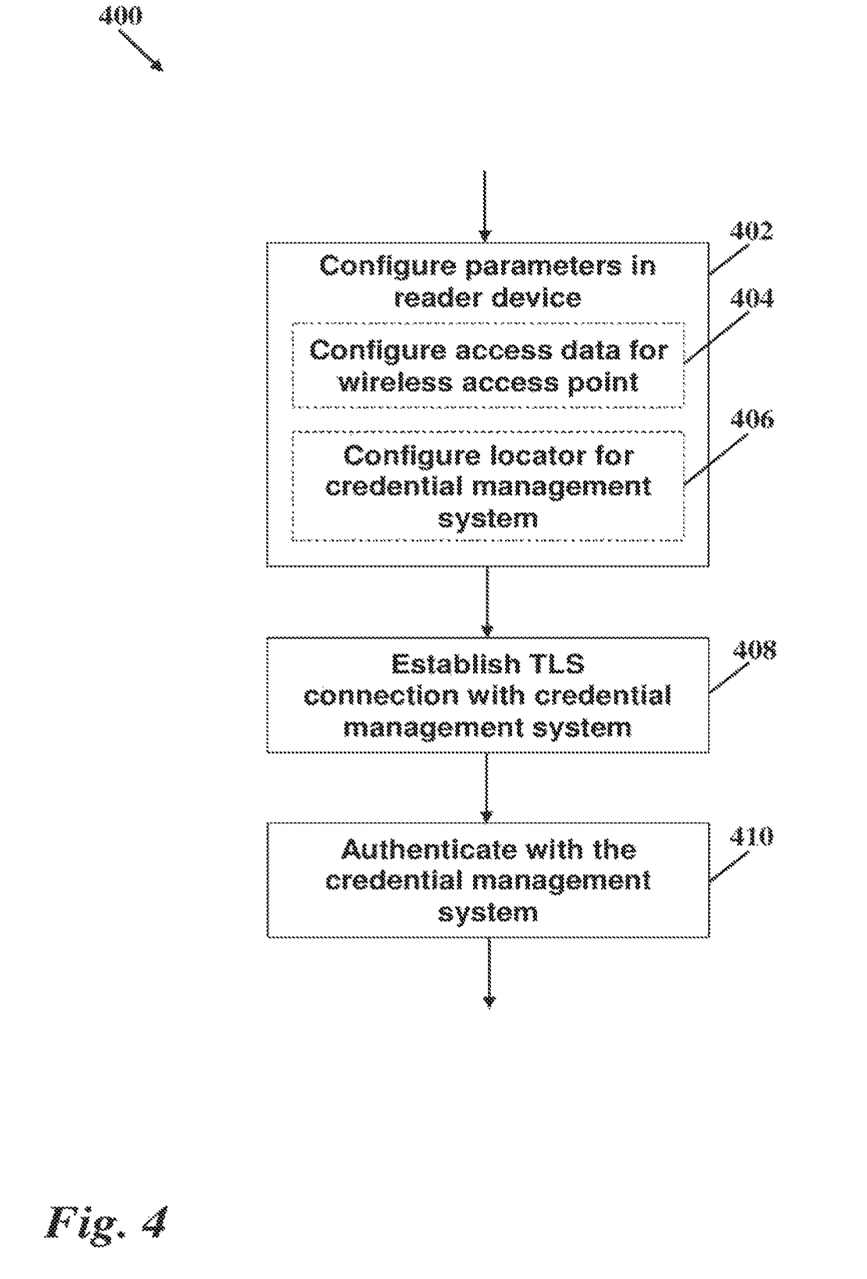
FIG. 4 is a simplified flow diagram of at least one embodiment of a method for establishing a secure wireless connection between a reader device and credential management system.

Referring now to FIG. 4, in use, the access control system 100 or, more particularly, the reader device 104 may execute a method 400 for establishing the secure wireless connection with the credential management system 102. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which a plurality of parameters may be configured in the reader device 104 to establish a secure Wi-Fi channel to the credential management system 102. In particular, in block 404, the reader device 104 may configure access data for a wireless access point (e.g., router) to which the reader device 104 is to establish a Wi-Fi connection. For example, configuring the access data may include configuring a Service Set Identifier (SSID) and a password for the wireless access point. Further, in block 406, the reader device 104 may configure a locator for the credential management system 102. In doing so, the reader device 104 is associated with the credential management system 102. For example, in the illustrative embodiment, the reader device 104 configures a Uniform Resource Locator (URL), which identifies the location at which the credential management system 102 may be accessed. As such, the reader device 104 may subsequently connect to the credential management system 102 via Wi-Fi using the URL as a base to invoke the credential APIs. In other embodiments, the credential management system 102 may be identified using another suitable locator. In some embodiments, the reader device 104 may utilize a TLS certificate for communicating using a Secure Hyper Text Transfer Protocol (HTTPS). It should be further appreciated that the reader device 104 may configure additional or alternative parameters in other embodiments.

In block 408, the reader device 104 establishes a secure TLS connection/channel with the credential management system 102. For example, the reader device 104 may establish a Wi-Fi connection using the configured parameters. In block 410, the reader device 104 authenticates with the credential management system 102. Although such authentication is described herein in reference to establishing the secure wireless connection with the credential management system 102, it should be appreciated that such authentication may be performed independently from establishing the secure wireless connection in other embodiments. As described below, the access control system 100 may execute a method 500 of FIG. 5 for authenticating the reader device 104 with the credential management system 102.

Figure 5:
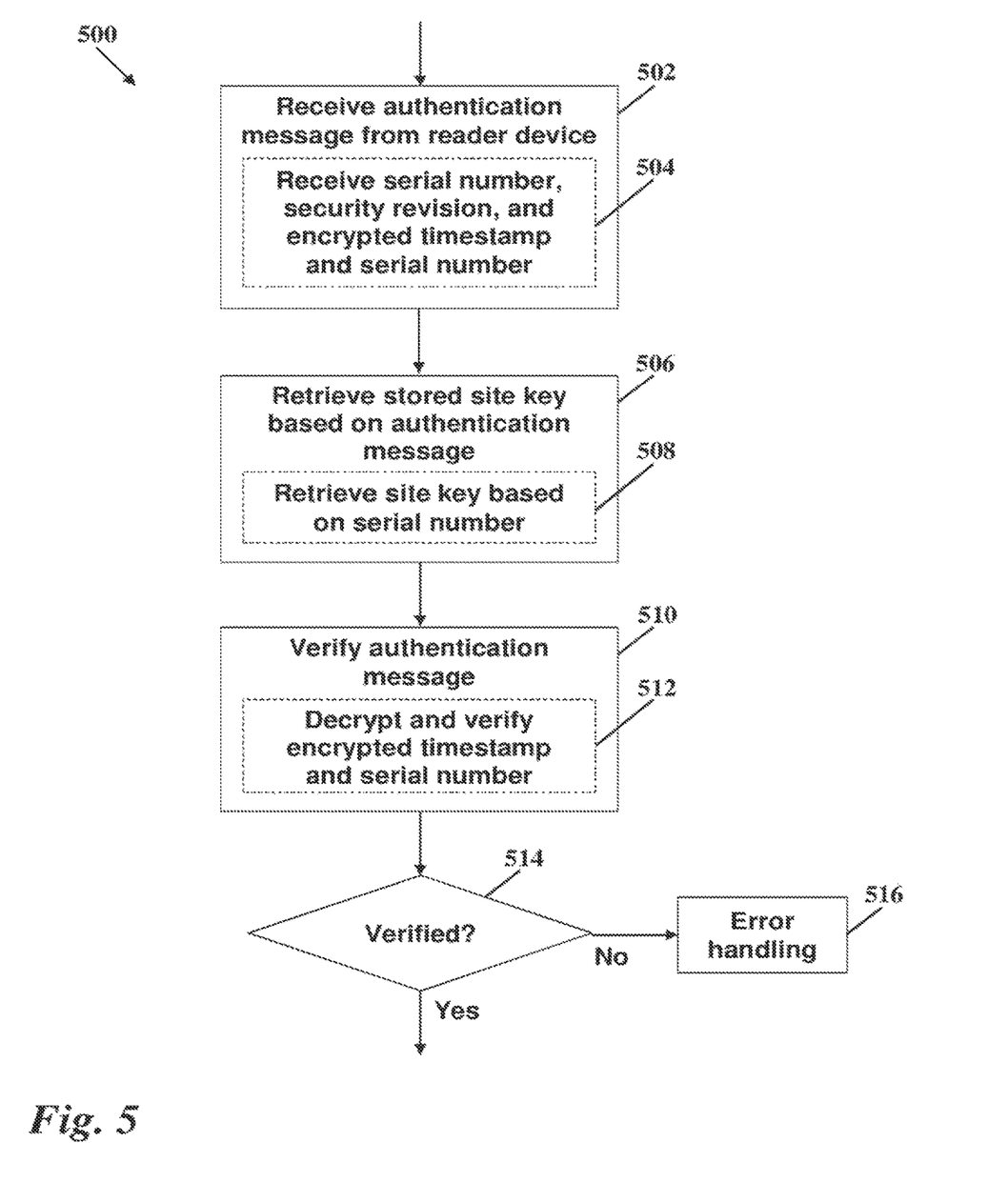
FIG. 5 is a simplified flow diagram of at least one embodiment of a method for authenticating the reader device with the credential management system.

Referring now to FIG. 5, it should be appreciated that the particular blocks of the method 500 are illustrated by way of example, and such blocks may be combined or divided, added or removed, and/or reordered in whole or in part depending on the particular embodiment, unless stated to the contrary. In the illustrative embodiment, the method 500 assumes the reader device 104 has established a TLS connection with the credential management system 102 (e.g., by virtue of execution of the method 300). Further, in some embodiments, the reader device 104 may include a hard-coded root certificate, and the credential management system 102 may be required to use a certificate based on the root certificate in order for the reader device 104 to authenticate the credential management system 102 and to initiate a secure IP connection.

The illustrative method 500 of FIG. 5 begins with block 502 in which the credential management system 102 receives an authentication message from the reader device 104. In particular, in block 504, the credential management system 102 may receive an authentication message including a serial number of the reader device 104, a current revision of a security subsystem of the reader device 104, and an encrypted payload including the serial number and a timestamp. For example, the authentication message may be formatted according to SN|$ENC_{SK}$(Timestamp,SN)|Srev, where SN is a serial number of the reader device 104, $ENC_{SK}(\cdot)$ indicates encryption using a site key (e.g., using a symmetric cryptographic site key, cipher block chaining, and a zero initialization vector), Timestamp is a timestamp, and Srev is a current revision of the security subsystem of the reader device 104. Although the fields are illustrated as concatenated fields, it should be appreciated that the various fields of the authentication message may be otherwise organized and/or ordered in other embodiments. Further, the authentication message may include additional or alternative data in other embodiments.

In block 506, the credential management system 102 retrieves the stored site key based on the authentication message. In particular, in block 508, the credential management system 102 may retrieve the appropriate site key based on the unencrypted serial number identified in the authentication message. For example, in some embodiments, the serial number may be transmitted to the credential management system 102 as the first field (SN) in the SN|$ENC_{SK}$(Timestamp,SN)|Srev authentication message described above. In some embodiments, the credential management system 102 may include a key management subsystem configured to store site keys in connection with corresponding reader device serial numbers for various reader devices 104 by which a reader device serial number may be compared to identify the appropriate site key.

In block 510, the credential management system 102 verifies the authentication message. In particular, in block 512, the credential management system 102 may decrypt and verify the encrypted timestamp and serial number in the authentication message received in block 502. That is, the credential management system 102 may utilize the site key retrieved from the key management subsystem to decrypt the encrypted payload, $ENC_{SK}$(Timestamp,SN), received with the authentication message and compare the decrypted serial number to the unencrypted serial number received with the authentication message to confirm they match. Further, the timestamp may be compared to a current time to ensure that too much time has not passed since the transmission of the authentication message. In doing so, the credential management system 102 may ensure that the difference between the transmission time and the receipt time has not exceeded a predetermined threshold.

If the credential management system 102 determines in block 514 that the authentication message has been appropriately verified, the method 500 terminates. In some embodiments, once the login is verified, the reader device 104 and/or one or more access control devices 108 may securely communicate with the credential management system 102. However, if the credential management system 102 determines in block 514 that the authentication message has not been verified, the method 500 advances to block 516 in which the credential management system 102 may perform one or more suitable error handling procedures. For example, in some embodiments, the reader device 102 and/or one or more access control devices 108 may be prevented from securely communicating with the credential management system 102.

In some embodiments, the techniques described herein may be used in conjunction with the reader device 104 and the credential device 106 establishing no-tour data that is stored to the credential device 106. It should be appreciated that no-tour data may include credential data that may be presented to an access control device 108 by a user of the credential device 106 to configure the access control device 108 to allow the holder of the credential device 106 access rights to the access control device 108 (i.e., without an access control administrator configuring the access control device 108 herself). For example, in some embodiments, the reader device 104 writes an encrypted credential (e.g., encrypted with the site key) to the credential device 106, which may be decrypted and verified by the appropriate access control device 108 (e.g., with the same site key) when the credential device 106 is presented to the access control device 108, thereby granting access rights to the holder of the credential device 106.

What is claimed is:

1. A method, comprising:
   receiving, by a credential management system and from a credential reader device, an authentication message including a unique identifier of the credential reader device;
   retrieving, by the credential management system, a key based on the authentication message;
   verifying, by the credential management system, the authentication message to authenticate the credential reader device to the credential management system by verifying the unique identifier of the credential reader device using the key retrieved by the credential management system;
   reading, by the credential reader device, a unique credential identifier of a passive credential device;
   transmitting, by the credential reader device, the unique credential identifier of the passive credential device to the credential management system via a secure wireless connection;
   receiving, by the credential reader device, credential device data from the credential management system via the secure wireless connection; and
   transmitting, by the credential reader device, the received credential device data to the passive credential device.

2. The method of claim 1, wherein the authentication message further comprises an encrypted payload including the unique identifier.

3. The method of claim 2, wherein verifying the authentication message comprises decrypting the encrypted payload using the key retrieved by the credential management system.

4. The method of claim 1, wherein the unique identifier of the credential reader device comprises a serial number of the credential reader device.

5. The method of claim 1, wherein retrieving the key based on the authentication message comprises retrieving the key based on the unique identifier of the credential reader device identified in the authentication message.

6. The method of claim 1, wherein the secure wireless connection comprises a secure Wi-Fi connection between the credential reader device and the credential management server.

7. The method of claim 1, wherein the credential device data comprises a set of instructions for transmittal to an access control device.

8. The method of claim 1, wherein the credential device data comprises a set of no-tour data, and further comprising:
receiving, by an access control device and from the passive credential device, the no-tour data at a user's next presentation of the passive credential device to the access control device; and
updating, by the access control device, access permissions of the passive credential device to a physical area secured by the access control device based on the no-tour data.

9. The method of claim 1, wherein receiving the authentication message by the credential management system and from the credential reader device comprises directly communicating, by the credential reader device, with a wireless access point for secure Wi-Fi communication with the credential management system.

10. The method of claim 1, wherein receiving the authentication message by the credential management system and from the credential reader device comprises directly communicating, by the credential reader device, with a gateway device via a Bluetooth communication connection between the credential reader device and the gateway device.

11. The method of claim 1, wherein the passive credential device is a smartcard.

12. An access control system, comprising:
an access control device; and
a credential reader device configured to (i) read a unique credential identifier of a passive credential device exclusively powered by wireless signals transmitted by one or more external devices, (ii) autonomously transmit the unique credential identifier to a credential management system over a secure wireless connection, (iii) receive no-tour data from the credential management system over the secure wireless connection, wherein the no-tour data is intended for transmittal to an access control device at a user's next presentation of the passive credential device to the access control device, and (iv) transmit the received no-tour data to the passive credential device; and
wherein the access control device is configured to update one or more configurations of the access control device in response to receipt of the no-tour data from the passive credential device at the user's next presentation of the passive credential device to the access control device.

13. The access control system of claim 12, wherein the secure wireless connection comprises a secure Wi-Fi connection.

14. The access control system of claim 13, further comprising a wireless access point; and
wherein the credential reader device directly communicates with the wireless access point for secure Wi-Fi communication with the credential management system.

15. The access control system of claim 12, further comprising a gateway device; and
wherein the credential reader device directly communicates with the gateway device using a wireless communication connection different from a Wi-Fi communication connection.

16. The access control system of claim 12, wherein the wireless communication connection different from the Wi-Fi communication connection comprises a Bluetooth communication connection.

17. The access control system of claim 12, wherein the passive credential device is a smartcard.

18. An access control system, comprising:
a credential management system;
a passive credential device;
at least one of a wireless access point or a gateway device; and
a credential enrollment reader configured, without being physically connected to another computing device, to (i) read a unique credential identifier of the passive credential device, (ii) transmit the unique credential identifier to the credential management system over a secure wireless connection, (iii) receive credential device data from the credential management system over the secure wireless connection, and (iv) transmit the received credential device data to the passive credential device to update the passive credential device with access control rights associated with the access control system; and
wherein the credential enrollment reader directly communicates with the at least one of the wireless access point or the gateway device for secure wireless communication with the credential management system.

19. The access control system of claim 18, wherein the passive credential device is powered exclusively by wireless signals transmitted by one or more external devices.

20. The access control system of claim 18, wherein the credential enrollment reader directly communicates with the at least one of the wireless access point or the gateway device via at least one of Wi-Fi communication or Bluetooth communication.

* * * * *